UNITED STATES PATENT OFFICE.

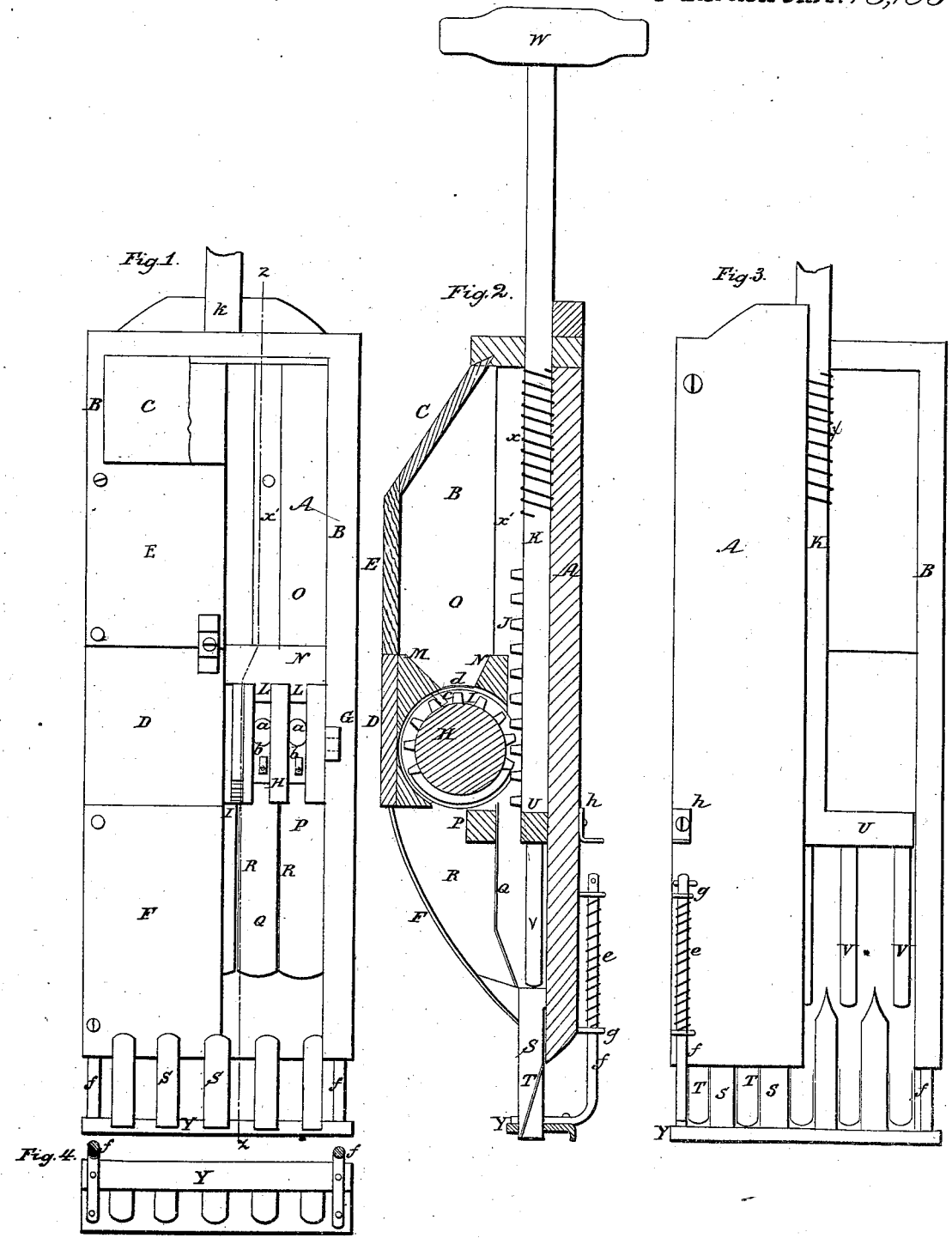

JOSEPH THOMPSON, OF DURHAMVILLE, NEW YORK.

IMPROVEMENT IN SEED-PLANTERS.

Specification forming part of Letters Patent No. 16,409, dated January 13, 1857.

*To all whom it may concern:*

Be it known that I, JOSEPH THOMPSON, of Durhamville, in the county of Oneida and State of New York, have invented certain new and useful Improvements in Seed-Planters; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is a front elevation of the planter. The front covering of the right half is omitted to show the interior. Fig. 2 is a sectional elevation, showing the machine cut through the line $z\ z$ of Fig. 1. Fig. 3 is an elevation of the back, one-half of the back board being removed to show the interior; Fig. 4, plan of spring-plate on planting-tubes.

The nature of my invention consists in arranging a plate around the planting tubes or punches, which plate is held by springs, so as to yield and allow the punches and tubes to slip through it when they are forced into the ground to deposit seed, and as they are withdrawn the springs press the plate down, so as to hold the earth firmly around the tubes and punches while they slip up through it, thereby preventing them from becoming clogged by the earth, even if it is wet or moist, which enables the farmer to plant with my machine when he could not with any heretofore in use.

In the accompanying drawings the board which forms the back of the machine is shown at A, having the sides B B fastened to it, which parts, with the doors C and D, board E, and plate F, form the outside or case of the planter.

About midway on the inside of the sides B B there is a slot for the sides G, in which the journals of the roller H are fitted to turn, which has a gear, I, on a portion of its periphery, which is acted upon by the rack J on the traversing bar K when the machine is operated to plant seed.

The roller H has a series of scores around it, L L, which are made wider than any of the seed intended to be planted. In each of these scores there is a hole, $a$, for the seed to fall in when it is up and out when it is down. The holes $a\ a$ are elongated and provided with slides $b\ b$, arranged to enlarge or reduce the holes to suit the seed being planted, as shown in Fig. 1.

The cleat M on the door D has a series of brushes fastened in it to project into the scores L L and hold back all the seed in the score except what has fallen into the holes $a$. One of these brushes is shown by dotted lines in Fig. 2 at $c$. There is a piece of sheet metal, $d$, fastened to the cleat M, so as to keep the seed out of the gear I.

The cleat N is fastened to the back A, and provided with scores, so as to fit the roller H, so as to form a seed-box, O, above said roller, which may be supplied with seed through the sliding door C.

There is a cleat, P, fastened to the back A, below the roller H, from which cleat the lower part is divided by the metal plate Q, so as to form an apartment in front for the seed to descend and one in the rear for the apparatus that forces the seed out of the tubes.

In the front apartment there is a series of partitions, R R, corresponding with the ridges on the roller H, so arranged as to conduct the seed from each of the holes $a$ in the roller to their appropriate tubes S, when they fall where they lodge upon and are retained by the springs T, awaiting the descent of the punches V V, which force them by the springs out of the tubes, so as to leave them in the ground.

The punches V V are fastened to the bar U, which bar is fastened to the traversing bar K, which is provided with a handle, W, by which it is operated and the machine carried. This traversing bar K is arranged to traverse just inside of the back A, and is pushed down by the hand, so that the punches V V force the seed out of the tubes, and it is drawn up by the spiral spring $x$, aided by the raising of the handle $w$, to lift the machine and carry it. The bar K, rack J, and spring $x$ are protected from the seed by the metal casing X′.

In order to prevent the earth which may adhere to the tubes S S from being lifted by said tubes, especially if the earth is wet or moist, I have applied the spring-plate Y around the tubes, which is held down by the spiral springs $e\ e$ on the rods $f\ f$, to which the plate Y is fastened, the rods being arranged to traverse in the stands $g$, fastened to the back A, so that the plate Y is forced up on the tubes when they are pushed into the ground to deposit the seed, and is held firmly against the ground when the tubes are drawn out, so as to scrape off any earth which may adhere to them and leave it around the seed, where it is required.

The stands $h$ are fastened to the back A for the ends of the rods $f$ $f$ to stop against, and these stands may be set to graduate the depth the seed is planted by stopping the plate Y at the required point on the tubes.

The machine having been constructed and completed as above described, the seed is put into the box O, the holes $a$ in the roller H being adjusted to suit the size or quantity of the seed to be planted. The operator takes hold of the handle $w$ and pushes it down, which turns the seed-holes $a$ up, so that they are filled. He then lifts the handle which turns the roller so that the seed falls from the roller into the tube S on the spring T, so that when the handle is pushed down again the tubes S are forced into the earth until the plate Y is stopped by the rods $f$ striking the stands $h$, when the punches $v$ $v$ force the seed by the springs T out of the tubes, so as to leave them in the ground. As the tubes are drawn up the springs $e$ press the plate Y against the ground, so as to hold the earth firm around the tubes and seed, which is a great advantage never before attained, besides it keeps the tubes from clogging if the ground is wet or moist or otherwise adhesive, so that it could not be planted with any of the machines heretofore made.

I find a scored or grooved roller a great advantage in planting long seeds—such as beans, or gourd-seed corn—as the grooves arrange the seed in a proper direction to fall into the holes in the roller.

I believe I have described my improvements in seed-planters so as to enable any person skilled in the art to make and use the same. I will now state what I desire to secure by Letters Patent, to wit:

I claim—

The spring-plate Y, or its equivalant, so constructed and arranged as to hold the earth down firmly while the punches V and tubes S are drawn out of the earth, substantially as described.

JOSEPH THOMPSON.

Witnesses:
J. DENNIS, Jr.,
JOHN S. HOLLINGSHEAD.